(12) United States Patent
Arai (10) Patent No.: US 11,006,089 B2
(45) Date of Patent: May 11, 2021

(54) INFORMATION PROCESSING APPARATUS AND INFORMATION PROCESSING METHOD

(71) Applicant: CANON KABUSHIKI KAISHA, Tokyo (JP)

(72) Inventor: Tomoaki Arai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/294,175

(22) Filed: Mar. 6, 2019

(65) Prior Publication Data
US 2019/0289275 A1    Sep. 19, 2019

(30) Foreign Application Priority Data

Mar. 14, 2018   (JP) .............................. JP2018-047183

(51) Int. Cl.
| | |
|---|---|
| *H04N 13/111* | (2018.01) |
| *H04N 13/282* | (2018.01) |
| *H04N 13/296* | (2018.01) |
| *H04N 5/232* | (2006.01) |

(52) U.S. Cl.
CPC ....... *H04N 13/111* (2018.05); *H04N 5/23218* (2018.08); *H04N 13/282* (2018.05); *H04N 13/296* (2018.05)

(58) Field of Classification Search
None
See application file for complete search history.

(56) References Cited

U.S. PATENT DOCUMENTS

| | | | | |
|---|---|---|---|---|
| 6,445,815 B1* | 9/2002 | Sato | ......................... | G06T 7/73 382/154 |
| 6,762,789 B1* | 7/2004 | Sogabe | ..................... | G06F 3/14 348/36 |
| 6,778,171 B1* | 8/2004 | Kikinis | ................... | G06T 19/00 342/357.31 |

(Continued)

FOREIGN PATENT DOCUMENTS

JP    2015225529 A    12/2015

OTHER PUBLICATIONS

IP.Com search report.*
Machine level translation of Baba, JP 2015225529 A.*

*Primary Examiner* — Mohammad J Rahman
(74) *Attorney, Agent, or Firm* — Carter, Deluca & Farrell LLP (57) ABSTRACT

An apparatus comprises: an identification unit configured to identify an object position and/or an occurrence position of an event in an image capturing region; a selection unit configured to select, based on an identified position, one or more sets of cameras among a plurality of sets of cameras associated respectively with a plurality of specific positions in the image capturing region, wherein a set of cameras among the plurality of sets of cameras includes a plurality of cameras for capturing, respectively form different directions, a specific position associated with the set of cameras; an acquisition unit configured to acquire information indicating a position and a direction of a virtual viewpoint; and a generation unit configured to generate a virtual viewpoint image according to the indicated virtual viewpoint.

15 Claims, 8 Drawing Sheets

(56) References Cited

U.S. PATENT DOCUMENTS

| | | | |
|---|---|---|---|
| 7,956,891 B2* | 6/2011 | Uchihara | H04N 5/232933 348/143 |
| 8,854,457 B2* | 10/2014 | De Vleeschouwer | G11B 27/105 348/135 |
| 9,088,772 B2* | 7/2015 | Koizumi | H04N 5/2254 |
| 9,648,346 B2* | 5/2017 | Zhang | H04N 19/597 |
| 10,244,163 B2* | 3/2019 | Matsushita | H04N 5/23229 |
| 10,413,803 B2* | 9/2019 | Bhuruth | A63B 71/0622 |
| 2001/0043738 A1* | 11/2001 | Sawhney | G01S 5/163 382/154 |
| 2003/0033318 A1* | 2/2003 | Carlbom | G06F 16/784 |
| 2005/0079914 A1* | 4/2005 | Kaido | A63F 13/10 463/30 |
| 2008/0211929 A1* | 9/2008 | Uchihara | H04N 5/232939 348/231.99 |
| 2009/0128563 A1* | 5/2009 | Gloudemans | G06K 9/346 345/427 |
| 2011/0102596 A1* | 5/2011 | Kotani | G08B 13/19645 348/159 |
| 2012/0057852 A1* | 3/2012 | Devleeschouwer | G11B 27/034 386/278 |
| 2012/0278428 A1* | 11/2012 | Harrison | H04N 21/2665 709/217 |
| 2013/0109470 A1* | 5/2013 | Yamashita | A63F 13/10 463/31 |
| 2013/0215233 A1* | 8/2013 | Wang | G06T 7/55 348/47 |
| 2014/0113728 A1* | 4/2014 | Tezuka | G07F 17/3237 463/42 |
| 2016/0027209 A1* | 1/2016 | Demirli | G06F 3/015 345/419 |
| 2016/0119607 A1* | 4/2016 | Konno | G06T 3/00 348/47 |
| 2016/0140733 A1* | 5/2016 | Gu | H04N 13/172 348/43 |
| 2016/0205341 A1* | 7/2016 | Hollander | G06T 7/20 375/240.08 |
| 2016/0212384 A1* | 7/2016 | Sawada | G06T 19/003 |
| 2017/0048334 A1* | 2/2017 | Shibahara | H04L 67/146 |
| 2017/0096106 A1* | 4/2017 | Higuchi | B60R 1/00 |
| 2017/0111565 A1* | 4/2017 | Shibahara | H04N 5/04 |
| 2017/0232334 A1* | 8/2017 | Tokunaga | A63F 13/655 463/31 |
| 2017/0318275 A1* | 11/2017 | Khalid | H04N 5/232 |
| 2017/0372360 A1* | 12/2017 | Duggal | G06Q 30/0255 |
| 2018/0160049 A1* | 6/2018 | Aizawa | H04N 5/247 |
| 2019/0238819 A1* | 8/2019 | Furukawa | G06T 15/205 |
| 2019/0262705 A1* | 8/2019 | Trombetta | A63F 13/525 |
| 2019/0356906 A1* | 11/2019 | Handa | H04N 13/239 |
| 2020/0120275 A1* | 4/2020 | Zhong | G06T 7/80 |
| 2020/0268471 A1* | 8/2020 | Kajita | H04N 5/222 |
| 2020/0404162 A1* | 12/2020 | Uno | H04N 13/282 |

\* cited by examiner

| EVENT | TIME INFORMATION | POSITION INFORMATION | PLAYER ID |
|---|---|---|---|
| KICK-OFF | 18:00:00 | xx.xxxxx/yy.yyyyy | P19 |
| SHOOT 1 | 18:31:40 | xx.xxxxx/yy.yyyyy | P05 |
| FOUL | 18:33:01 | xx.xxxxx/yy.yyyyy | P03 |
| THROW-IN | 18:35:32 | xx.xxxxx/yy.yyyyy | P13 |
| SHOOT 2 | 18:42:03 | xx.xxxxx/yy.yyyyy | P11 |

FIG. 6

| TIME INFORMATION | POSITION INFORMATION | | | |
|---|---|---|---|---|
| | BALL | PLAYER 01 (P01) | PLAYER 02 (P02) | PLAYER 03 (P03) |
| 18:00:00 | xx.xxxxx/yy.yyyyy | xx.xxxxx/yy.yyyyy | xx.xxxxx/yy.yyyyy | xx.xxxxx/yy.yyyyy |
| 18:00:01 | xx.xxxxx/yy.yyyyy | xx.xxxxx/yy.yyyyy | xx.xxxxx/yy.yyyyy | xx.xxxxx/yy.yyyyy |
| 18:00:02 | xx.xxxxx/yy.yyyyy | xx.xxxxx/yy.yyyyy | xx.xxxxx/yy.yyyyy | xx.xxxxx/yy.yyyyy |
| 18:00:03 | xx.xxxxx/yy.yyyyy | xx.xxxxx/yy.yyyyy | xx.xxxxx/yy.yyyyy | xx.xxxxx/yy.yyyyy |
| ... | ... | ... | ... | ... |

FIG. 8

| GAZING POINT ID | POSITION INFORMATION (CENTER COORDINATES) | RADIUS [M] |
|---|---|---|
| 01 | xx.xxxxx/yy.yyyyy | 10 |
| 02 | xx.xxxxx/yy.yyyyy | 10 |
| 03 | xx.xxxxx/yy.yyyyy | 10 |

| GAZING POINT ID | POSITION INFORMATION (CENTER COORDINATES) | RADIUS [M] | RELATED CAMERA ID |
|---|---|---|---|
| 01 | xx.xxxxx/yy.yyyyy | 10 | C01, C02 |
| 02 | xx.xxxxx/yy.yyyyy | 10 | C11, C12, C13 |
| 03 | xx.xxxxx/yy.yyyyy | 10 | C20, C22 |

FIG. 12

INFORMATION PROCESSING APPARATUS AND INFORMATION PROCESSING METHOD

BACKGROUND OF THE INVENTION

Field of the Invention

The present invention relates to an information processing apparatus and an information processing method.

Description of the Related Art

Attention has been given to a technology in which a plurality of cameras are provided at different positions and perform synchronous photographing at multiple viewpoints, and a virtual viewpoint image corresponding to an arbitrarily designated virtual viewpoint is generated by using a multi-viewpoint image acquired by photographing. According to the technology described above, for example, a specific scene (such as, a goal scene) in soccer, basketball and the like can be viewed from various angles, thus a high presence compared to a normal image can be given to the user. Further, an image processing apparatus such as a server aggregates images photographed by the plurality of cameras associated with a specific position (for example, directed to the specific position) in the space of a photographing object (target space for image capturing), performs processing such as three-dimensional model generation and rendering, and transmits a virtual viewpoint image that has been generated to a user terminal. Thus, generation and viewing of the virtual viewpoint image based on a plurality of viewpoint images can be realized. Note that, the specific position refers to a predetermined position on a field, such as a center of a field, a goalmouth, and a penalty mark, in a case of soccer. Note that, the specific position to which the plurality of cameras are directed may be referred to as a gazing point in some cases hereinafter.

Japanese Patent Laid-Open No. 2015-225529 discloses a technique for determining a position and a direction of a virtual viewpoint based on a position and a direction of a user terminal.

However, in a case where cameras used for photographing a plurality of viewpoint images are divided into a plurality of sets of cameras directed to different specific positions, it is conceivable that a virtual viewpoint image cannot be generated with high image quality. For example, a case where the photographing object (capturing target) is a soccer game, half of the provided cameras are directed to one goalmouth, and the other half are directed to the other goalmouth. In this case, when a virtual viewpoint image including a region around one goal is to be generated using a photographed image by a sets of cameras directed to a specific position of the other goalmouth, there is a risk that the generation of the virtual viewpoint image may fail or the image quality of the virtual viewpoint image generated may be lowered. Note that similar problems may occur not only in sports competition, but also in viewing a concert and other events.

SUMMARY OF THE INVENTION

In an embodiment, an information processing apparatus comprises: an identification unit configured to identify at least one of an object position and an occurrence position of an event in an image capturing region; a selection unit configured to select, based on a position identified by the identification unit, one or more sets of cameras among a plurality of sets of cameras associated respectively with a plurality of specific positions in the image capturing region, wherein a set of cameras among the plurality of sets of cameras includes a plurality of cameras for capturing, respectively from different directions, a specific position associated with the set of cameras; an acquisition unit configured to acquire viewpoint information indicating a position and a direction of a virtual viewpoint; and a generation unit configured to generate a virtual viewpoint image according to the virtual viewpoint indicated by the acquired viewpoint information by using a plurality of images based on image capturing by the one or more sets of cameras selected by the selection unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Hereinafter, the same or equivalent components, members, and processes illustrated in the drawings are denoted by the same reference numerals, and a repetitive description thereof will be omitted. Further, a part of the members that are not important in description in each drawing are omitted as appropriate.

In an embodiment, a virtual viewpoint image is generated using an image group photographed (captured) by a plurality of photographing devices. At this time, one of a plurality of specific positions (gazing points) associated with (directed to) by a plurality of cameras is selected and determined, and a virtual viewpoint image is generated by using the image group photographed by the photographing devices associated with the specific position that has been determined. As a result, a virtual viewpoint image including a region around the determined specific position can be generated with high image quality.

Figure 1:
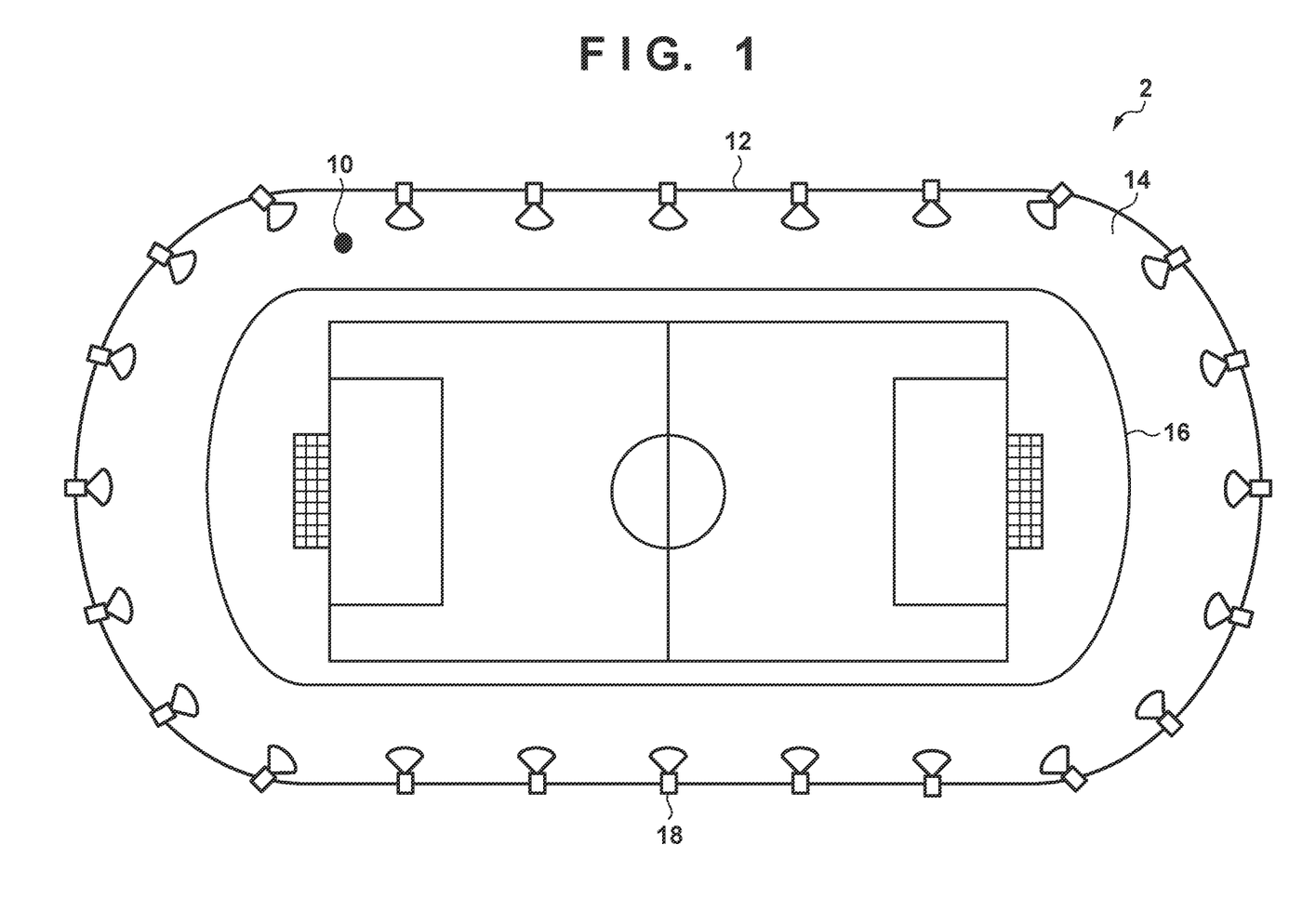
FIG. 1 is a diagram illustrating a schematic example of an image processing system according to an embodiment.

FIG. 1 is a diagram illustrating a schematic example of an image processing system 2 according to an embodiment. As illustrated in FIG. 1, a plurality of cameras 18 are provided in a stadium 12 including audience seats 14 and a field 16 that actually performs competition and the like. The plurality of cameras 18 are disposed such that each of the cameras 18 photographs at least a part of the field 16 which is a predetermined photographing object region, and can overlap an angle of view. For example, the plurality of cameras 18 are provided to surround the field 16 and the audience seats 14. Further, a user 10 is watching the competition from the audience seat 14. The user 10 holds a user terminal, enjoys live watching, and operates the user terminal as necessary to playback and check an event scene such as a shoot, a foul, or a goal. In the present embodiment, a virtual viewpoint image of an appropriate event scene is provided in response to such a playback instruction. Note that the operation for the playback of the virtual viewpoint image may be performed by a user terminal located at a place different from the stadium to be photographed, or may be performed after the end of the competition.

Figure 2:
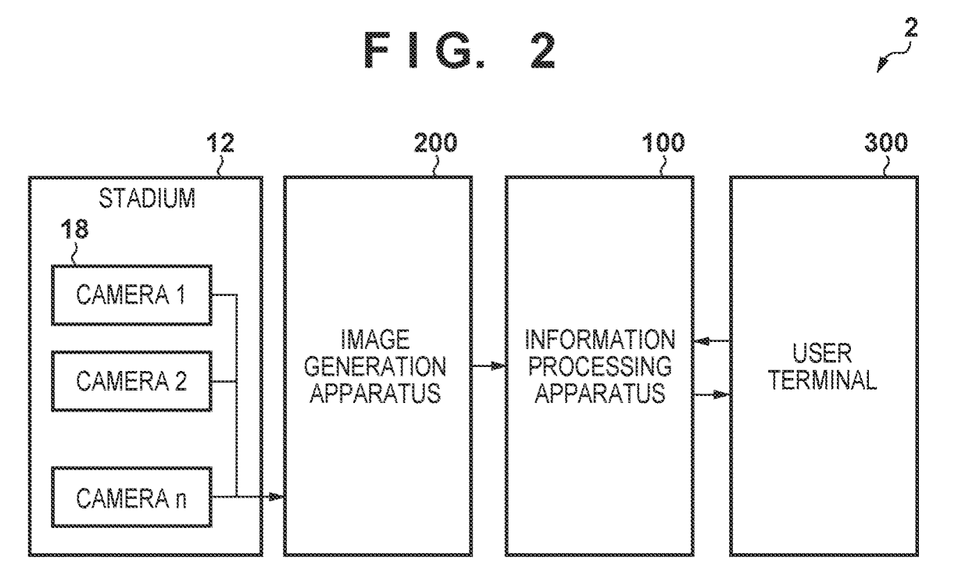
FIG. 2 is a schematic configuration diagram of the image processing system according to an embodiment.

FIG. 2 is a schematic configuration diagram of the image processing system 2 according to the present embodiment. As illustrated in FIG. 2, the image processing system 2 includes a plurality of cameras 18 provided in the stadium 12, an image generation apparatus 200, an information processing apparatus 100, and a user terminal 300. The plurality of cameras 18 are connected to each other via a transmission cable, and are connected to the image generation apparatus 200. Each of the plurality of cameras 18 transmits an image acquired by photographing the field 16 by the camera 18 to the image generation apparatus 200.

In the example illustrated in FIG. 1, the plurality of cameras 18 are disposed such that a range of all or a part of the stadium 12, such as a soccer field, is photographed by the plurality of cameras 18. The plurality of cameras 18 may be cameras for acquiring a still image, cameras for acquiring a video, or cameras for acquiring both a still image and a video. In the present embodiment, the term "image" is described as being either a still image or a video, unless otherwise identified.

The image generation apparatus 200 is an apparatus that generates the virtual viewpoint image. The image generation apparatus 200 accumulates images photographed by the plurality of cameras 18 (hereinafter may be referred to as photographed images). The image generation apparatus 200 generates a set of virtual viewpoint images using the photographed images from the plurality of cameras 18. Note that an image acquired by performing image processing such as a process of extracting a specific region from a photographed image may be accumulated as an image based on photographing by the camera 18, and may be used to generate the virtual viewpoint image. The set of virtual viewpoint images includes a plurality of virtual viewpoint images respectively corresponding to different virtual viewpoints. The image generation apparatus 200 transmits the generated set of virtual viewpoint images and gazing point data (point-of-gaze data) to the information processing apparatus 100. The gazing point data are information indicating the positions of a plurality of the gazing points set in the stadium 12 to be photographed (in the photographing object). Each of the cameras 18 is provided toward any one of the set gazing points and each of the gazing points is photographed from different directions by two or more cameras 18. The image generation apparatus 200 is, for example, a server device, and has a database function for storing a plurality of the photographed images and the set of virtual viewpoint images that have been generated, and an image processing function for generating the virtual viewpoint image. Further, the plurality of cameras 18 in the stadium 12 and the image generation apparatus 200 are connected via a wired or wireless communication network line or a cable line such as Serial Digital Interface (SDI). The image generation apparatus 200 receives the photographed images from the plurality of cameras 18 via this line and stores the photographed images in a database. Note that, the details of the gazing point data will be described later.

The information processing apparatus 100 selects a virtual viewpoint image to be provided to the user terminal 300 from the set of virtual viewpoint images generated by the image generation apparatus 200. That is, the information processing apparatus 100 is an apparatus that determines a virtual viewpoint related to the virtual viewpoint image output to the user terminal 300 or a direction of a line of sight from the virtual viewpoint. The information processing apparatus 100 selects one gazing point from a plurality of the gazing points indicated by the gazing point data acquired from the image generation apparatus 200. The information processing apparatus 100 determines the virtual viewpoint and the direction of the line of sight of the virtual viewpoint image to be generated based on the selected gazing point and user terminal information acquired from the user terminal 300. The user terminal information includes, for example, terminal operation information indicating operation contents, position information indicating the position of the terminal, and the like. The terminal operation information includes information indicating an operation such as designation of a virtual viewpoint or playback of a virtual viewpoint image. The information processing apparatus 100 selects the virtual viewpoint image from the set of virtual viewpoint images generated by the image generation apparatus 200 based on the virtual viewpoint that has been determined and the direction of the line of sight of the virtual viewpoint image, and outputs the selected virtual viewpoint image to the user terminal 300. Note that there is no limitation to this, and information indicating the gazing point and the virtual viewpoint determined by the information processing apparatus 100 may be transmitted to the image generation apparatus 200. Then, the image generation apparatus 200 selects a photographed image by the sets of cameras corresponding to the gazing point determined by the information processing apparatus 100 from the photographed images by the plurality of cameras 18 provided in the stadium 12. In the present embodiment, the plurality of cameras 18 that are provided are classified into a plurality of sets of cameras corresponding to a plurality of specific positions (gazing points). Each set of cameras includes a plurality of cameras that respectively photograph the specific position (gazing point) corresponding to the sets of cameras from different directions respectively. The image generation apparatus 200 may generate the virtual viewpoint image corresponding to the virtual viewpoint by processing the selected photographed image based on the designated virtual viewpoint, and output the virtual viewpoint image to the information processing apparatus 100.

The information processing apparatus 100 is, for example, a personal computer. Note that the information processing apparatus 100 may be incorporated in the image generation apparatus 200, or may be incorporated in the user terminal 300. That is, the information processing apparatus 100 may be an apparatus integrated with the image generation apparatus 200, or may be an apparatus integrated with the user terminal 300.

The user terminal 300 is an information processing apparatus owned by the user 10 using the image processing system 2 according to the present embodiment. Note that the user terminal 300 may be an information processing apparatus associated with an ID of the user 10. The user terminal 300 displays the virtual viewpoint image output from the information processing apparatus 100 on a display screen included in the user terminal 300. Further, the user terminal 300 receives, for example, an instruction to move the position of the virtual viewpoint, to change the line of sight direction of the virtual viewpoint, or to switch the virtual viewpoint based on an input by the user 10. The user terminal 300 generates a transmission signal including the virtual viewpoint information indicating the content of the received instruction, and transmits the transmission signal to the information processing apparatus 100. The virtual viewpoint information indicates the position and the direction of the virtual viewpoint designated by an operation of the user. Further, the user terminal 300 requests the information processing apparatus 100 to automatically set a virtual viewpoint based on the position information automatically.

The user terminal 300 may be, for example, a personal computer, or a mobile terminal such as a smartphone or a tablet terminal. The user terminal 300 includes at least one of a mouse, a keyboard, a six-axis controller, and a touch panel, for example. The user terminal 300 has a function of acquiring position information by a positioning unit such as a Global Positioning System (GPS).

The image generation apparatus 200, the information processing apparatus 100, and the user terminal 300 are connected to each other via a network such as the Internet, so as can exchange information with each other. The communication between the devices may be wireless communication, wired communication, or a combination thereof.

Figure 3:
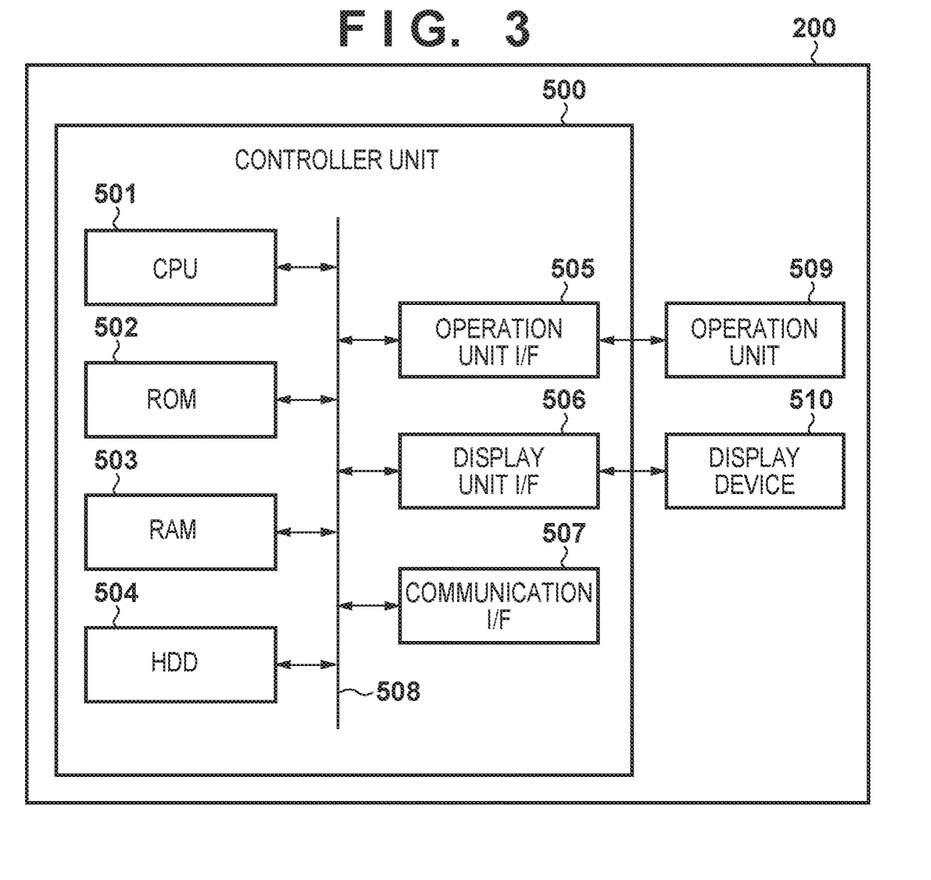
FIG. 3 is a diagram illustrating an example of a hardware configuration of the image generation apparatus in FIG. 2.

FIG. 3 is a diagram illustrating an example of a hardware configuration of the image generation apparatus 200. Both of the information processing apparatus 100 and the user terminal 300 has a hardware configuration similar to the hardware configuration illustrated in FIG. 3. The image generation apparatus 200 includes a controller unit 500, an operation unit 509, and a display device 510.

The controller unit 500 includes a CPU 501. The CPU 501 activates an Operating System (OS) by a boot program stored in a ROM 502. The CPU 501 executes an application program stored in a Hard Disk Drive (HDD) 504 on the OS. The CPU 501 realizes various processes by executing application programs. A RAM 503 is used as a work area of the CPU 501. The HDD 504 stores the application program and the like. Note that the CPU 501 may be a single processor or a plurality of processors.

The CPU 501 is mutually connected to the ROM 502, the RAM 503, the HDD 504, the operation unit I/F 505, a display unit I/F 506, and a communication I/F 507 via a system bus 508. The operation unit I/F 505 is an interface with the operation unit 509. The operation unit I/F 505 transmits the information input by the user via the operation unit 509 to the CPU 501. The operation unit 509 includes, for example, a mouse and a keyboard. The operation unit 509 may be a touch panel. The display unit I/F 506 outputs image data to be displayed on the display device 510 to the display device 510. The display device 510 includes a display such as a liquid crystal display. The communication I/F 507 is an interface for performing communication, such as an Ethernet (trade name) interface, and is connected to a transmission cable (not illustrated). The communication I/F 507 inputs/outputs information to/from an external apparatus via a transmission cable. Note that the communication I/F 507 may include a circuit and an antenna for performing wireless communication. Further, the image generation apparatus 200 can perform display control for displaying an image on an external display device connected via a cable or a network. In this case, the image generation apparatus 200 realizes display control by outputting the display data to the display device. Note that neither of the configurations illustrated in FIG. 3 is necessarily indispensable. For example, the display device 510 is not indispensable in the image generation apparatus 200. Note that, although the controller unit 500 includes the CPU 501 in the above description, there is no limitation to this. For example, the controller unit 500 may include hardware such as an ASIC or an FPGA instead of the CPU 501 or together with the CPU 501. In this case, hardware such as an ASIC or an FPGA may perform part or all of the processes to be performed by the CPU 501.

Information Processing Apparatus 100

Figure 4:
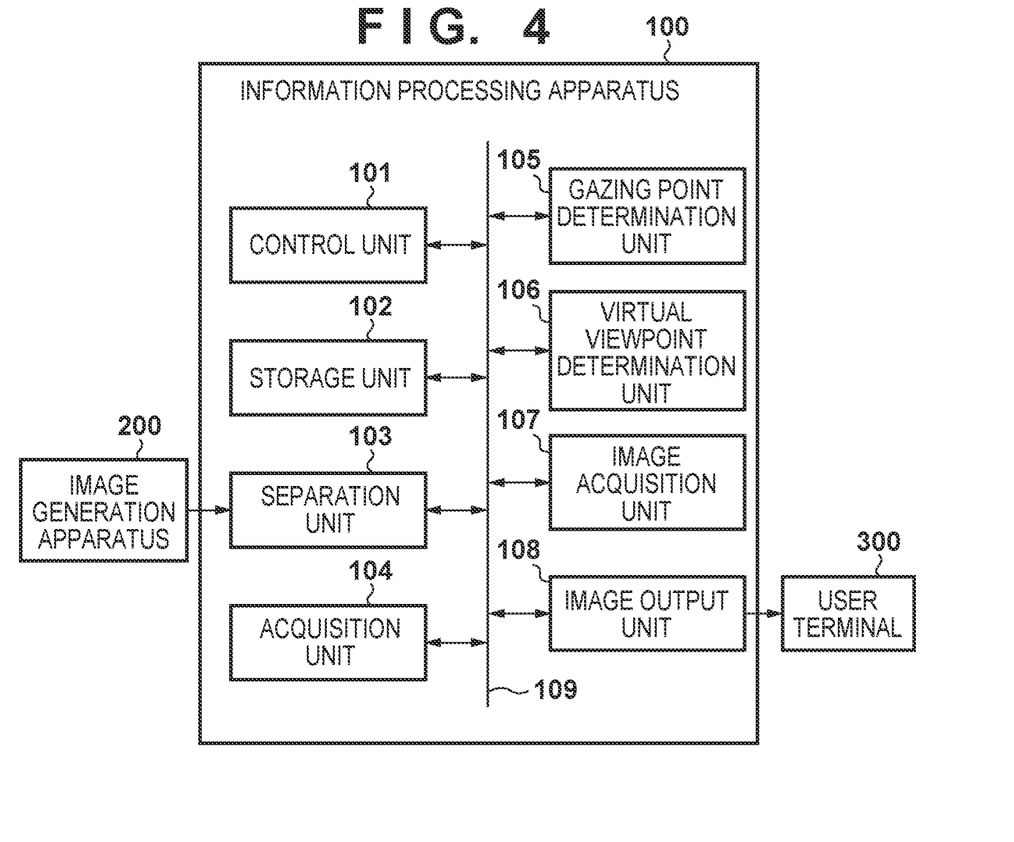
FIG. 4 is a block diagram illustrating an example of functions and configurations of the information processing apparatus in FIG. 2.

FIG. 4 is a block diagram illustrating an example of functions and configurations of the information processing apparatus 100 according to the present embodiment. Each configuration illustrated in FIG. 4 is realized by the CPU 501 in FIG. 3 reading out various programs recorded in the ROM 502 and executing control of each unit. Note that some or all of the configurations illustrated in FIG. 4 may be realized by a dedicated hardware. The dedicated hardware is, for example, an ASIC or an FPGA.

The information processing apparatus 100 includes a control unit 101, a storage unit 102, a separation unit 103, an acquisition unit 104, a gazing point determination unit 105, a virtual viewpoint determination unit 106, an image acquisition unit 107, and an image output unit 108. These members are connected to each other via an internal bus 109, and can transmit and receive data mutually under the control of the control unit 101.

The control unit 101 controls the overall operation of the information processing apparatus 100 according to a computer program stored in the storage unit 102. The storage unit 102 includes a non-volatile memory such as a hard disk. The non-volatile memory of the storage unit 102 stores the computer program and the like for controlling the overall operation of the information processing apparatus 100. The separating unit 103 separates and outputs the set of virtual viewpoint images and the gazing point data acquired from the image generation apparatus 200.

The acquisition unit 104 acquires position information and terminal operation information related to the user 10 from the user terminal 300. The acquisition unit 104 may acquire the position information acquired by the user terminal 300 by the GPS as the position information of the user 10 from the user terminal 300. Further, the acquisition unit 104 may acquire information indicating a position such as a seat number of the audience seat 14 of the stadium 12 from the user terminal 300, and identify the position information of the user 10 based on the acquired information. In addition to the position information, the acquisition unit 104 (event acquisition unit) acquires event information and object position information related to the photographing object from an external database (not illustrated).

Figure 5:
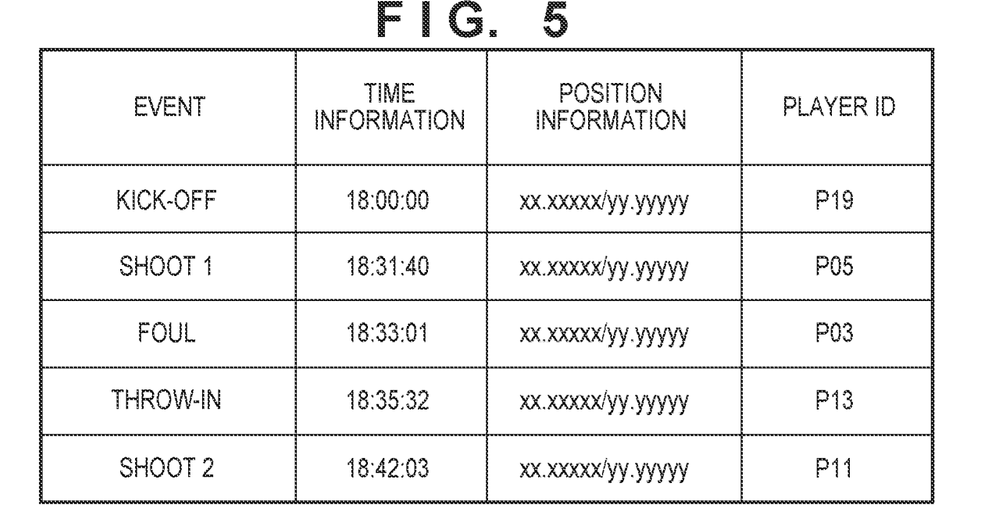
FIG. 5 is a data structure diagram illustrating a configuration of event information.

FIG. 5 is a data structure diagram showing a configuration of the event information. For example, the event information includes an event (a situation), time information, position information, and a player ID. The event is, for example, an event caused by a player such as a shoot or a foul, or a start position of a set play such as a throw-in or a kick-off in a ball game such as soccer. The time information is composed of HH (hour): MM (minute): SS (second), and indicates the time when the event occurred. The position information indicates a position where the event occurred by using a degree format of latitude and longitude. The player ID is an identification number composed of an alphabet and a number, and assigned to all the players. The event information is sent from an external database when an event occurs. Note that the content of the event indicated by the event information is not limited to the example illustrated in FIG. 5. For example, the event information may indicate a position where a plurality of objects, such as a person or a ball, touched as the occurrence position of the event.

Figure 6:
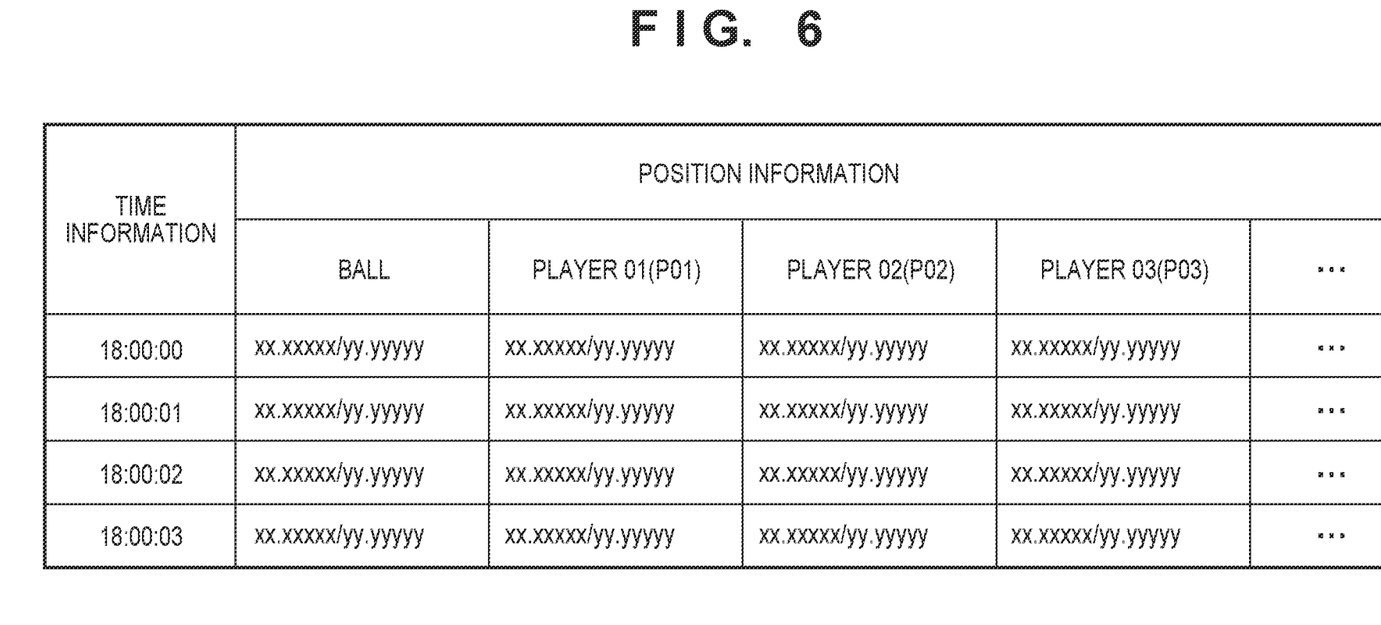
FIG. 6 is a data structure diagram illustrating a configuration of object position information.

FIG. 6 is a data structure diagram illustrating a configuration of object position information. The object position information includes time information and position information. The time information is composed of HH (hour): MM (minute): SS (second). The position information indicates the object position (for example, a ball or a player) by using a degree format of latitude and longitude. The object position information is periodically sent, for example, every second, from the external database. However, there is no limitation to this, and the object position information may be sent from the external database at regular intervals, or may be sent in response to some event. Further, the event information and the object position information may be accumulated in the storage unit 102 via the acquisition unit 104. Note that, the information processing apparatus 100 may acquire an image based on photographing by the plurality of cameras 18 and generate at least one of the event information and the object position information based on the acquired image.

Referring back to FIG. 4, the gazing point determination unit 105 determines one gazing point from the gazing point data acquired from the image generation apparatus 200. At this time, the gazing point determination unit 105 may determine the gazing point using the event information and/or the object position information acquired by the acquisition unit 104. The gazing point determination unit 105 may also determine the gazing point based on operation information input from the user terminal 300 (for example, information corresponding to a designating operation of a gazing point by the user, information corresponding to a designation operation of a virtual viewpoint by the user, and the like).

The virtual viewpoint determination unit 106 determines the position of the virtual viewpoint and the direction of the line of sight of the virtual viewpoint image to be output to the user terminal 300. In the following description, it is assumed that the virtual viewpoint determination unit 106 determines the position on the three-dimensional coordinates as the position of the virtual viewpoint related to the virtual viewpoint image. However, in other embodiments, the virtual viewpoint determination unit 106 may determine the position on the two-dimensional plane. In this case, the virtual viewpoint determination unit 106 may determine a height of the position of the virtual viewpoint related to the virtual viewpoint image to an arbitrary value or a fixed value without using the position information acquired by the acquisition unit 104.

In a case where the acquisition unit 104 acquires user terminal information from the user terminal 300, the virtual viewpoint determination unit 106 may determine the position of the virtual viewpoint and the direction of the line of sight of the virtual viewpoint image to be output to the user terminal 300 based on the gazing point determined by the gazing point determination unit 105 and the position information included in the user terminal information. Alternatively, the virtual viewpoint determination unit 106 may acquire information corresponding to a designation operation of the virtual viewpoint from the user terminal 300 by the user, and determine the position and the direction of the virtual viewpoint based on the information.

The image acquisition unit 107 acquires the virtual viewpoint image corresponding to the virtual viewpoint and the direction of the line of sight determined by the virtual viewpoint determination unit 106. Note that the image acquisition unit 107 may have a function for generating a virtual viewpoint image by rendering based on information received from the image generation apparatus 200.

The image output unit 108 outputs the virtual viewpoint image acquired by the image acquisition unit 107 to the user terminal 300.

Image Generation Apparatus 200

Figure 7:
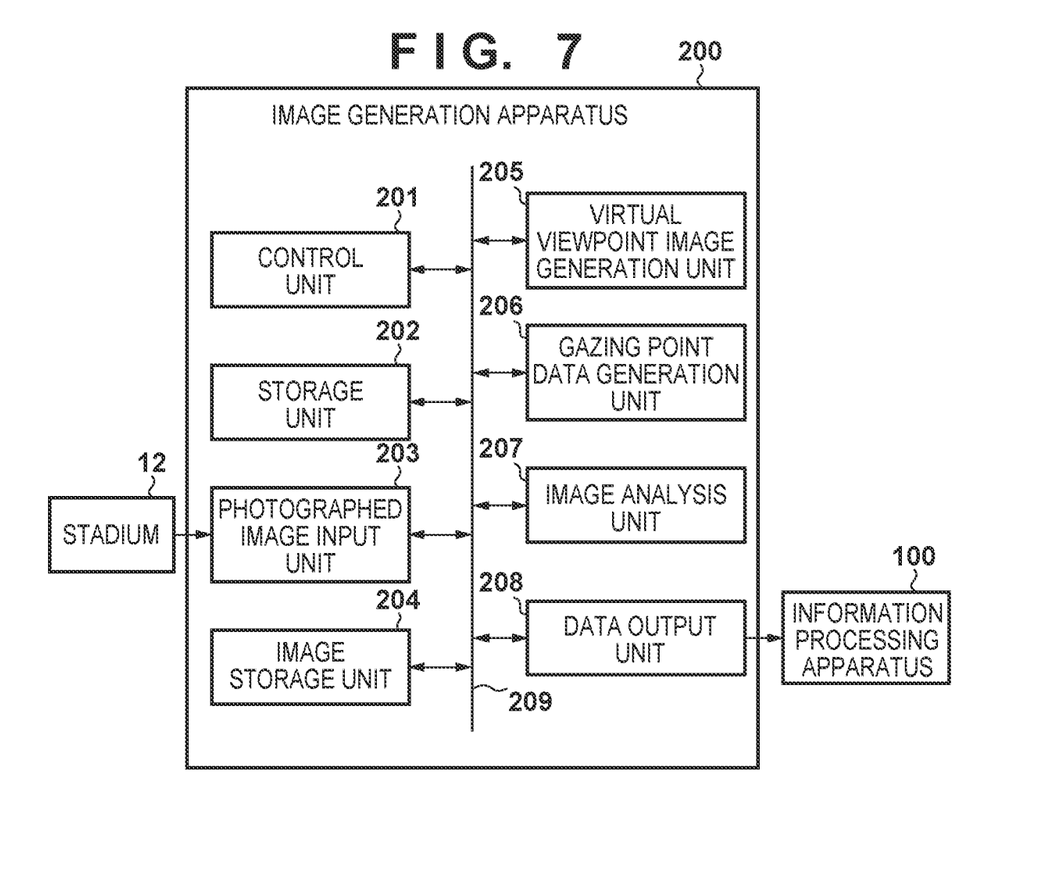
FIG. 7 is a block diagram illustrating an example of functions and configurations of the image generation apparatus in FIG. 2.

FIG. 7 is a block diagram illustrating an example of functions and configurations of the image generation apparatus 200 according to the present embodiment. The image generation apparatus 200 includes a control unit 201, a storage unit 202, a photographed image input unit 203, an image storage unit 204, a virtual viewpoint image generation unit 205, a gazing point data generation unit 206, an image analysis unit 207, and a data output unit 208. These members are connected to each other via an internal bus 209, and can transmit and receive data mutually under the control of the control unit 201.

The control unit 201 controls the overall operation of the image generation apparatus 200 according to a computer program stored in the storage unit 202. The storage unit 202 includes a non-volatile memory such as a hard disk. The non-volatile memory of the storage unit 202 stores the computer program and the like for controlling the overall operation of the image generation apparatus 200.

The photographed image input unit 203 acquires images photographed by the plurality of cameras 18 provided in the stadium 12 at a predetermined frame rate, and outputs the images to the image storage unit 204. The photographed image input unit 203 acquires photographed images by a wired or wireless communication module or an image transmission module such as SDI.

The image storage unit 204 is a large-capacity storage device that stores the photographed images acquired from the photographed image input unit 203 and the set of virtual viewpoint images generated based on them. As the image storage unit 204, for example, a magnetic disk, an optical disk, a semiconductor memory, and the like is used. Note that the image storage unit 204 may be physically external to the image generation apparatus 200. Further, the photographed image stored in the image storage unit 204 and the set of virtual viewpoint images generated based on the photographed images are stored, for example, in an Material eXchange Format (MXF) as an image format. The photographed image stored in the image storage unit 204 and the set of virtual viewpoint images generated based on the photographed image are compressed in the MPEG2 format, for example. However, the format of the data is not limited to these.

The virtual viewpoint image generation unit 205 generates the set of virtual viewpoint images from a plurality of photographed images stored in the image storage unit 204. As a method for generating the set of virtual viewpoint images, for example, a method using image-based rendering may be used. The image-based rendering is a rendering method for generating a virtual viewpoint image from an image photographed from a plurality of actual viewpoints without performing modeling (a process for creating a shape of an object by using a geometric figure). In addition, the method for generating the set of virtual viewpoint images is not limited to image-based rendering, and Model-Based Rendering (MBR) may be used. The MBR is a method for generating a virtual viewpoint image by using a three-dimensional model generated based on a plurality of photographed images acquired by photographing a subject from a plurality of directions. Specifically, the MBR is a technique that uses a three-dimensional shape (model) of a target scene acquired by a three-dimensional shape reconstruction method such as a visual volume intersection method, and Multi-View-Stereo (MVS), to generate an appearance of a scene from a virtual viewpoint as an image. In addition, the virtual viewpoint image generation unit 205 assigns the corresponding virtual viewpoint, the direction of the corresponding line of sight, and data indicating the gazing point generated by the gazing point data generation unit 206 to be described later, to each of the virtual viewpoint images included in the generated set of virtual viewpoint images. For example, the virtual viewpoint image generation unit 205 may assign metadata including the virtual viewpoint (position), the direction of the line of sight, and the data indicating the gazing point to the virtual viewpoint image.

Here, it is assumed that the set of virtual viewpoint images generated by the virtual viewpoint image generation unit 205 includes virtual viewpoint images of various virtual viewpoint positions and directions of the line of sight, and such the set of virtual viewpoint images is compressed and encoded in the spatial direction and the time direction as one image stream. However, in the other embodiments, the set of virtual viewpoint images may be composed of a plurality of independent images respectively instead of one image stream. Alternatively, the set of virtual viewpoint images may not be compressed and encoded.

Further, instead of the set of the virtual viewpoint images, the image generation apparatus 200 may generate information for generating a virtual viewpoint image such as, information indicating a three-dimensional model or an image for mapping to a three-dimensional model indicated by the information. That is, instead of generating the rendered virtual viewpoint image, the virtual viewpoint image generation unit 205 may generate information necessary for rendering the virtual viewpoint images by the information processing apparatus 100 or the user terminal 300.

The gazing point data generation unit 206 generates the gazing point data using the specific object acquired by the image analysis unit 207 or the position information of the specific position, and outputs the gazing point data to the virtual viewpoint image generation unit 205.

Figure 8:
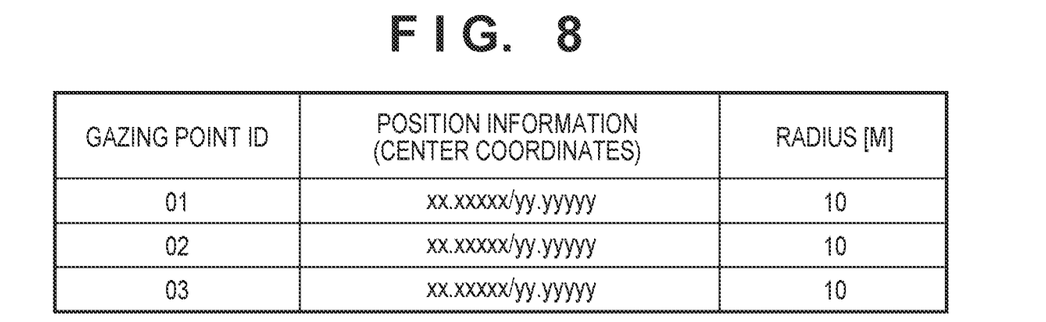
FIG. 8 is a data structure diagram illustrating a configuration of a gazing point data.

FIG. 8 is a data structure diagram illustrating the configuration of the gazing point data. The gazing point data includes, for example, a gazing point ID, position information, and a radius. Although the gazing point data may be information that can identify the position of the gazing point, the specific content is not limited to this. The gazing point ID is an identification number composed of an alphabet and a number, and assigned to all the gazing points. The position information indicates the center coordinates of the gazing point by using a degree format of latitude and longitude. The radius is a distance from the center coordinates and indicates an effective range for generating a virtual viewpoint image. Note that a circular region indicating the effective range defined by the center coordinates and the radius is referred to as a gazing point unit. In a case where a virtual viewpoint image is generated using a plurality of cameras 18 directed to one certain gazing point, a virtual viewpoint image of a region included in the gazing point unit corresponding to the gazing point can be particularly generated with high image quality. Note that the gazing point data is not limited to being acquired by analyzing the photographed images by the image analysis unit 207, and may be registered in advance in the image generation apparatus 200 or the information processing apparatus 100.

Referring back to FIG. 7, the image analysis unit 207 analyzes the photographed image input to the photographed image input unit 203, and acquires position information of the gazing point. The image analysis unit 207 acquires position information of a specific object or a specific position as the position information of the gazing point using a technique such as a visual hull. The specific object is a person such as a specific player or a referee, or a ball in the case of a sport competition. In addition, the gazing point may be a specific position on the field 16 such as a field center, a goalmouth, a penalty mark, or the like. Further, in a case where the camera 18 is provided such that the optical axes of the plurality of cameras 18 are directed to a common position, the gazing point may be the common position.

The data output unit 208 outputs the set of virtual viewpoint images generated by the virtual viewpoint image generation unit 205 to the information processing apparatus 100 at a predetermined frame rate.

Gazing Point Determination Processing

Figure 9:
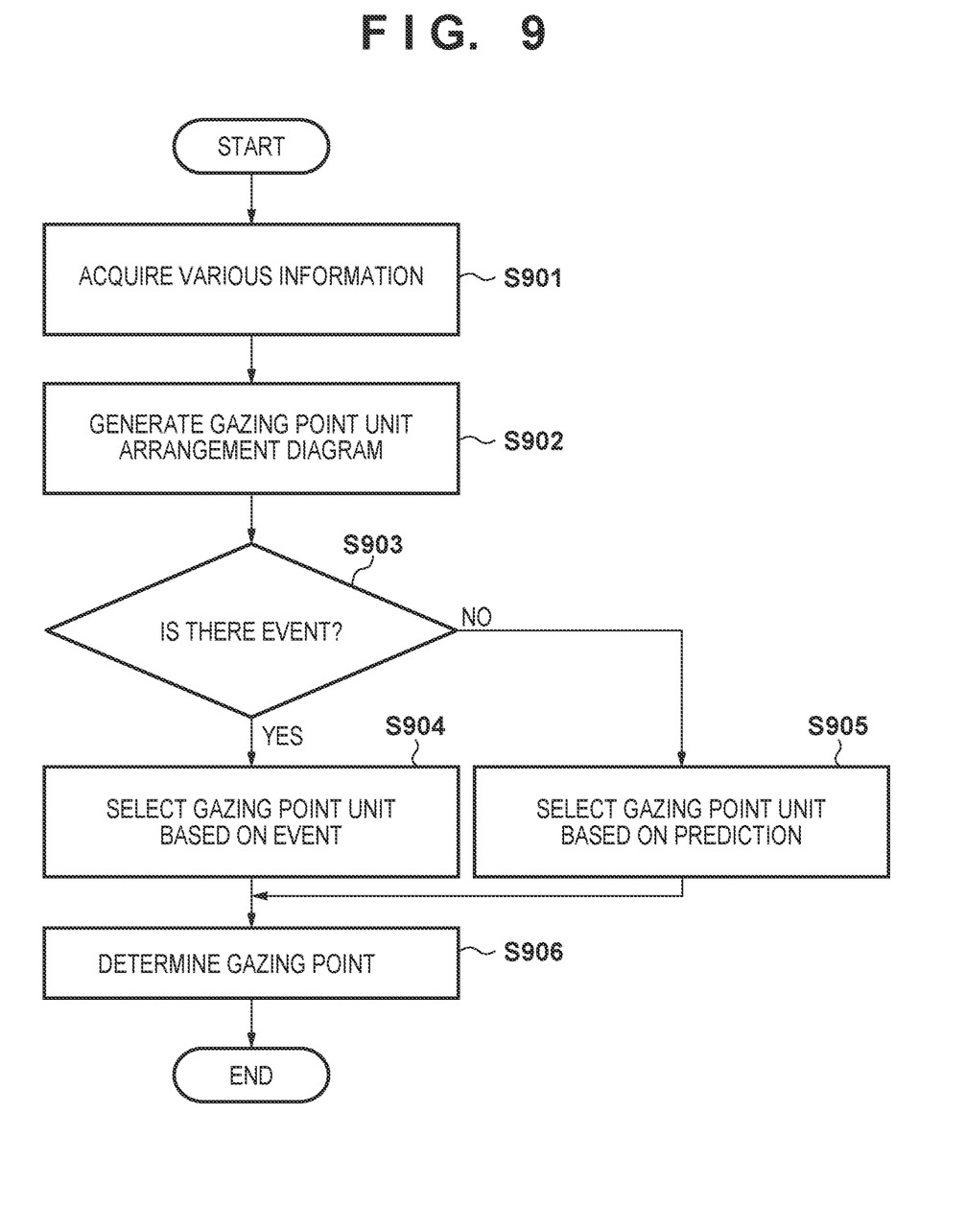
FIG. 9 is a flowchart illustrating a flow of a series of processes in a gazing point determination unit in FIG. 4.

FIG. 9 is a flowchart illustrating a flow of a series of processes in the gazing point determination unit 105. This flowchart illustrates a process for determining one gazing point from the plurality of the gazing points indicated by the gazing point data acquired from the image generation apparatus 200. Further, the flowchart is executed when the information processing apparatus 100 receives a playback request of a virtual viewpoint image from the user terminal 300.

In step S901, the gazing point determination unit 105 acquires the gazing point data via the separation unit 103. Further, the gazing point determination unit 105 acquires the event information and the object position information via the acquisition unit 104.

Figure 10:
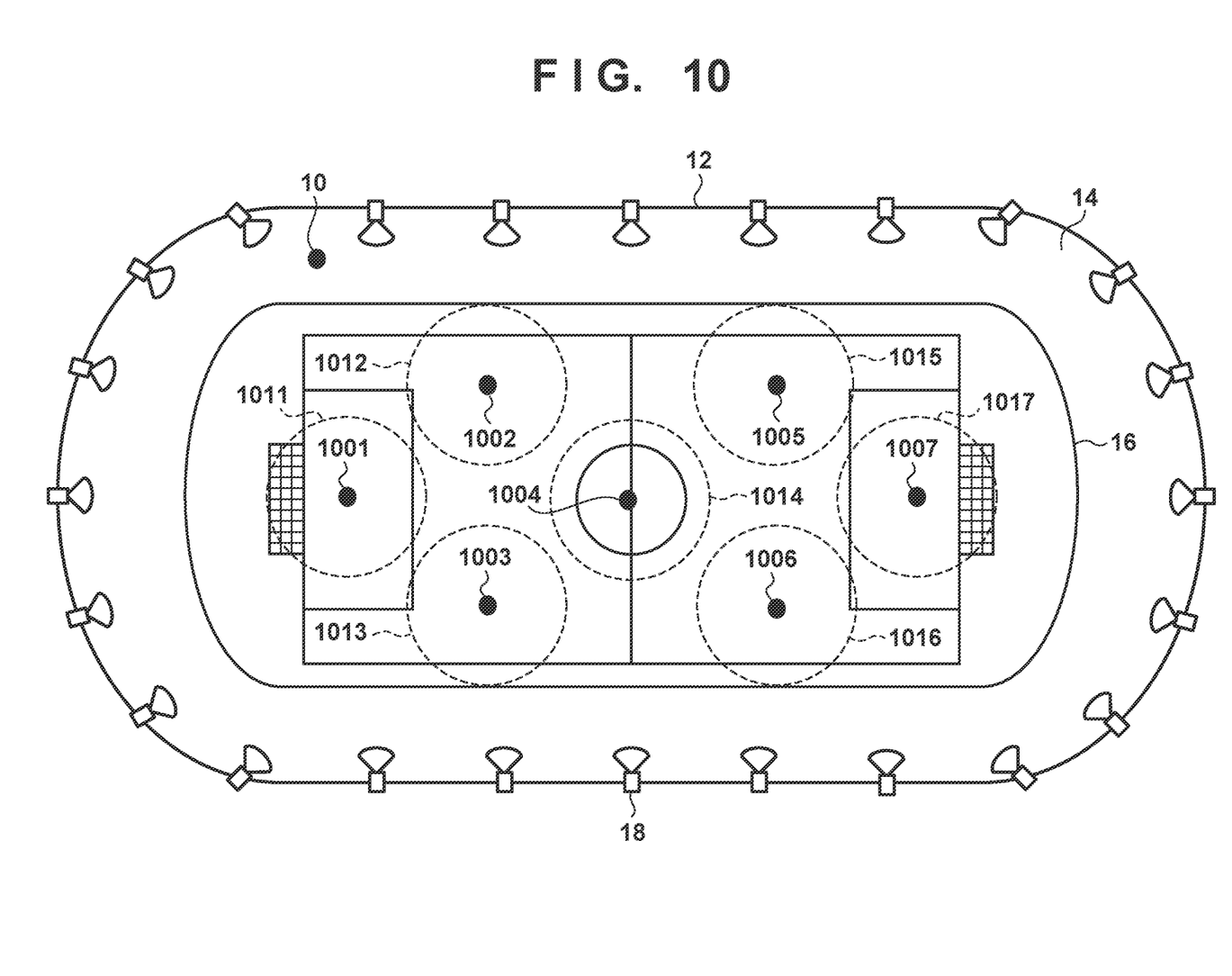
FIG. 10 is a schematic diagram illustrating an example of a gazing point unit arrangement diagram.

In step S902, the gazing point determination unit 105 generates a gazing point unit arrangement diagram using the gazing point data acquired in step S901. FIG. 10 is a schematic diagram illustrating an example of the gazing point unit arrangement diagram. In FIG. 10, 1001 to 1007 denote the gazing points, and 1011 to 1017 denote the gazing point units, respectively. The gazing point unit is a circle centered at the gazing point and indicates the effective range for generating the virtual viewpoint image. The gazing point determination unit 105 generates the gazing point unit using the center coordinates and the radius of each gazing point included in the gazing point data, and generates the gazing point unit arrangement diagram in which the generated gazing point unit is arranged in an overhead view of the stadium 12. Note that the gazing point unit is not limited to the above, and may be a predetermined range with reference to the gazing point. The shape of the gazing point unit is not limited to a circle, and may be another shape such as a polygon and the like. Note that each of the sets of cameras can also take a range outside the corresponding gazing point unit. That is, at least a part of the range can be photographed of the plurality of sets of cameras can overlap.

Referring back to FIG. 9, in step S903, the gazing point determination unit 105 determines the presence or absence of an event occurred most recently using the event information acquired in step S901. The gazing point determination unit 105 determines whether an event has occurred between the time at which the playback request of the virtual viewpoint image was received and the time backward from the relevant time by only a predetermined time. For example, in a case where the predetermined time is 30 seconds and the playback request is received at 18:42:15, if the event information is the content illustrated in FIG. 5, it is determined that the event "shoot 2" is the event occurred most recently. If it is determined that there is an event (Yes in S903), the process proceeds to S904, and if it is determined that there is no event (No in S903), the process proceeds to S905.

In step S904, the gazing point determination unit 105 selects a specific gazing point unit from the plurality of the gazing point units based on the event occurred most recently which is determined to exist in S903. The gazing point determination unit 105 extracts the position information of the event occurred most recently from the event information acquired in step S901, superimposes the position of the event based on the extracted position information on the gazing point unit arrangement diagram generated in step S902, and selects the gazing point unit including the superimposed position. If the position of the event is not included in any of the gazing point units, the gazing point unit nearest the position of the event among the plurality of the gazing point units may be selected corresponding to the plurality of sets of cameras capable of photographing the position of the event. Further, the gazing point determination unit 105 may analyze a series of paths of a player related to an event and select the gazing point unit including a starting point of the path as a specific gazing point unit. In this case, the gazing point determination unit 105 extracts the player ID of the player related to the event occurred most recently from the event information acquired in step S901, and analyzes the path of the player ID based on the object position information acquired in step S901. Note that the range of analysis is from the time at which the event occurred to the time back by a predetermined time, and may be, for example, in the playback time of the virtual viewpoint image. However, the period for extracting the event related to selecting the gazing point unit is not limited to the above. For example, in a case where the received playback request (playback instruction) identifies a specific time or a period in the past, that is, in a case where the playback request relates to the playback of the virtual viewpoint image based on the photographed image corresponding to the specific time or the period, the gazing point unit corresponding to a position of an event occurring in the predetermined period or a predetermined length of time before and after the specific time or period may be selected. In addition, the gazing point unit corresponding to an object position associated with the event occurring at or around the specific time or period may be selected.

In step S905, the gazing point determination unit 105 selects a specific gazing point unit from the plurality of gazing point units based on a prediction of an event occurrence using the object position information acquired in step S901. The selection of the gazing point unit may be, for example, selecting a gazing point unit including a ball and a player as a specific gazing point unit, or selecting a gazing point unit that nearest the ball. Alternatively, the selection of the gazing point unit may be selecting a gazing point unit including a player nearest the ball, or selecting a gazing point unit including a player designated by the user. Alternatively, the selection of the gazing point unit may be selecting a gazing point unit in which players are dense.

Note that, in FIG. 9, although one of the processes of S904 and S905 is selected and executed based on the presence or absence of an event in a predetermined period, there is no limitation to this. For example, the process of step S904 may always be performed, or the process of step S905 may always be performed, or whether the process of step S904 or the process of step S905 may be performed in advance. In addition, the gazing point unit may be selected based on both the occurrence position of the event and the position of the object. In step S906, the gazing point determination unit 105 outputs the gazing point, which is the center coordinate of the gazing point unit selected in step S904 or S905, to the virtual viewpoint determination unit 106.

According to the image processing system 2 according to the present embodiment, a specific gazing point is determined from the plurality of the gazing points based on the occurrence position of a predetermined event and the position of a predetermined object, and a virtual viewpoint image using the photographed image of the camera corresponding to the gazing point can be generated. Therefore, a virtual viewpoint image of a region important to the user viewing the virtual viewpoint image (a region including the occurrence position of the event and the position of the predetermined object) can be generated with high image quality. In addition, compared with a case where the photographed images of all the provided cameras are combined to generate the virtual viewpoint image, the processing load related to generation of the virtual viewpoint image and the amount of transmission data in the system can be reduced. Further, according to the present embodiment, it is possible to determine a specific gazing point based on the event occurrence prediction without the event occurred most recently, which leads to further improvement in convenience.

Modification

The configuration and operation of the image processing system 2 according to the embodiment has been described above. This embodiment is an example, and it is understood by those skilled in the art that various modifications are possible for each component and combination of processes, and that such modifications are also in the scope of the present invention.

In the above-described embodiment, the case where the process of the flowchart illustrated in FIG. 9 is executed when receiving the playback request of the virtual viewpoint image from the user terminal 300 has been described, but there is no limitation to this. The gazing point determining unit 105 may execute the process illustrated in FIG. 9 each time the latest event information is acquired via the acquiring unit 104. In this case, the information processing apparatus 100 transmits the virtual viewpoint image to the user terminal 300 each time. Upon receiving the virtual viewpoint image, the user terminal 300 switches the display to the playback of the virtual viewpoint image. Alternatively, the user terminal 300 may display a notification prompting the playback of the virtual viewpoint image on the screen. Thus, the virtual viewpoint image related to the event occurred most recently can be watched without being overlooked.

Further, in the above-described embodiment, the case where a specific gazing point is determined based on the event or the position of the object has been described, but there is no limitation to this. For example, the user may select a gazing point. In this case, the information processing apparatus 100 transmits the gazing point unit arrangement diagram generated by the gazing point determining unit 105 to the user terminal 300. Upon receiving the gazing point unit arrangement diagram, the user terminal 300 displays the gazing point unit arrangement diagram on the display to allow the user to select a desired gazing point unit. The information processing apparatus 100 receives the gazing point unit determined by the user operation on the displayed layout drawing from the user terminal 300, and generates the virtual viewpoint image based on the gazing point unit. However, as in the above-described embodiment, by determining the gazing point based on the occurrence position of the event and the position of the predetermined object, the trouble of the user involved in the selection of the gazing point can be reduced, and error of the user operation can be avoided. Further, for example, the gazing point may be selected based on the designation of the virtual viewpoint by the user. In this case, the information processing apparatus 100 receives information indicating the virtual viewpoint designated by the user operation from the user terminal 300, and selects the gazing point corresponding to the gazing point unit including the position of the virtual viewpoint and the gazing point nearest the virtual viewpoint. According to this method, a virtual viewpoint image corresponding to the virtual viewpoint designated by the user can be generated with high image quality. However, as in the above-described embodiment, by determining the gazing point based on the occurrence position of the event and the like, even in a case where different virtual viewpoints are designated by a plurality of the users, a single gazing point can be applied, and the amount of data output from the image generation apparatus 200 can be reduced.

Further, in the above-described embodiment, an example of photographing a soccer game has been described, but there is no limitation to this, the technical idea according to this embodiment can also be applied to other sports games such as rugby, tennis, ice skating, and basketball, and photographing performances such as live performances and concerts.

Further, the virtual viewpoint related to the generation of the virtual viewpoint image may be determined based on the gazing point determined by the information processing apparatus 100. For example, the direction of the virtual viewpoint may be automatically determined to face the determined gazing point, or the position of the virtual viewpoint may be automatically determined to be in the vicinity of the determined gazing point.

Figure 11:
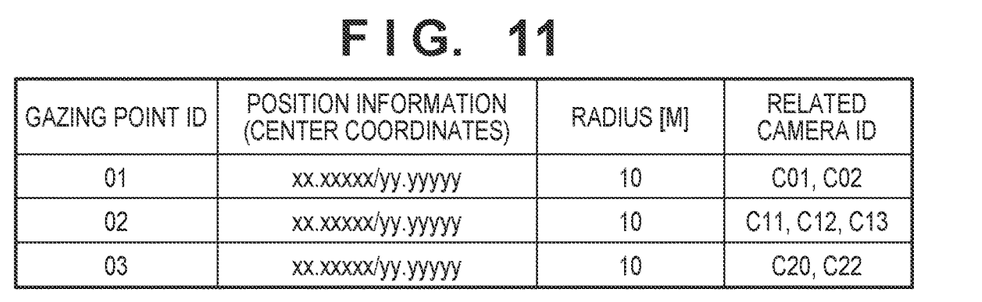
FIG. 11 is a data structure diagram illustrating a configuration of a gazing point data according to a modification.

Further, the gazing point data used for selecting the gazing point is not limited to that illustrated in FIG. 8. FIG. 11 is a data structure diagram illustrating a configuration of a gazing point data according to a modification. The gazing point data holds a gazing point ID, position information, a radius, and an related camera ID that is an ID of one or more cameras directed to the gazing point (the gazing position is included in its angle of view) in association. In the example of FIG. 11, the angles of view of the two cameras identified by the related camera ID "C01" and "C02" each include the position of the gazing point identified by the gazing point ID "01".

Figure 12:
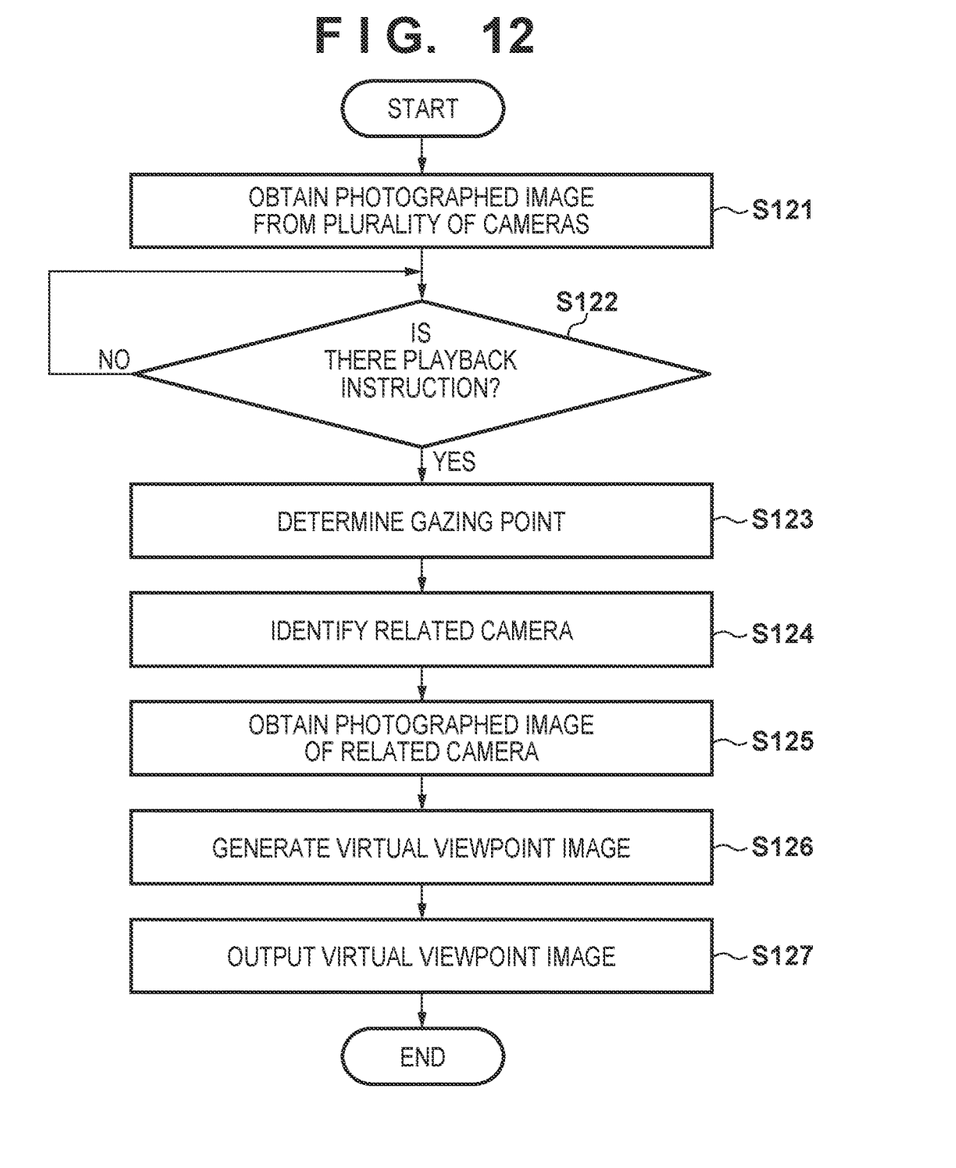
FIG. 12 is a flowchart illustrating a flow of a series of processes in an information processing apparatus according to the modification.

Further, the information processing apparatus 100 may generate and output a virtual viewpoint image based on the determined gazing point and virtual viewpoint. FIG. 12 is a flowchart illustrating a flow of a series of processes in the image processing system 2 in this case. In S121, the image generation apparatus 200 acquires a photographed image from the plurality of cameras 18 provided in the stadium 12. In S122, the information processing apparatus 100 waits for a playback instruction from the user terminal 300. When there is a playback instruction (YES in S122), the information processing apparatus 100 determines a gazing point in S123. The gazing point determination processing in S123 follows a series of processing in the gazing point determination unit 105 illustrated in FIG. 9. In S124, the information processing apparatus 100 refers to the gazing point data and identifies the set of cameras including cameras corresponding to the gazing point determined in S123. Specifically, the information processing apparatus 100 identifies the related camera ID that is held corresponding to the gazing point ID of the determined gazing point in the gazing point data illustrated in FIG. 11. Note that the information processing apparatus 100 may determine the plurality of the gazing points in S123 and may identify associated camera IDs of a plurality of sets of cameras corresponding to the plurality of the gazing points in S124.

In S125, the information processing apparatus acquires the image photographed by the sets of cameras identified in S124 from the image generation apparatus 200. In S126, the information processing apparatus 100 generates a virtual viewpoint image from the image acquired in S125. At this time, the information processing apparatus uses information indicating the position and direction of the virtual viewpoint received together with the playback instruction from the user terminal 300. In S127, the information processing apparatus outputs the generated virtual viewpoint image to the user terminal 300.

According to the above-described process, only the photographed image of the camera related to the determined gazing point is output from the image generation apparatus 200 to the information processing apparatus 100. Therefore, the processing load of the image generation apparatus 200 and the information processing apparatus 100 can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-047183, filed Mar. 14, 2018, which is hereby incorporated by reference herein in its entirety.

What is claimed is:

1. An information processing apparatus, comprising:
one or more hardware processors; and
one or more memories which store instructions executable by the one or more hardware processors to cause the information processing apparatus to perform at least:
specifying at least one of a position of an object and a position where an event occurred in an image capturing region subject to imaging by image capturing apparatuses;
specifying a plurality of target positions in the imaging capturing region, each of which corresponds to one of a plurality of sets of image capturing apparatuses, a plurality of image capturing apparatuses included in a set of image capturing apparatuses being oriented toward one target position associated with the set of image capturing apparatuses;
selecting, based on the specified position and the specified plurality of target positions, one or more sets of image capturing apparatuses for generating a virtual viewpoint image among the plurality of sets of image capturing apparatuses;
acquiring viewpoint information indicating a view direction from a virtual viewpoint and a position of the virtual viewpoint; and
generating a virtual viewpoint image according to the acquired viewpoint information by using a plurality of images obtained based on image capturing by the selected one or more sets of image capturing apparatuses.

2. The information processing apparatus according to claim 1, wherein in the selecting, a set of image capturing apparatuses corresponding to a target position nearest from the specified position is selected.

3. The information processing apparatus according to claim 1, wherein the instructions further cause the information processing apparatus to perform acquiring event information relating to capturing target of the plurality of sets of image capturing apparatuses, wherein the specified position is a position where the event indicated by the acquired event information occurred.

4. The information processing apparatus according to claim 3, wherein the acquired event information includes information indicating a time at which the event occurred, information indicating a position at which the event occurred, and information indicating an object related to the event.

5. The information processing apparatus according to claim 3, wherein the position indicated by the event information includes at least one of a shooting position, a set-play position, a foul occurrence position, and a contact position of a plurality of objects, in a ball game.

6. The information processing apparatus according to claim 1, the instructions further cause the information processing apparatus to perform:
acquiring event information relating to capturing target of the plurality of sets of image capturing apparatuses, wherein
the specified position is a position of an object associated with a specific event indicated by the acquired event information.

7. The information processing apparatus according to claim 1, wherein the object is a person or a ball.

8. The information processing apparatus according to claim 1, the instructions further cause the information processing apparatus to perform:
receiving a playback instruction for designating a time included in an image capturing period of the plurality of sets of image capturing apparatuses, wherein
in the specifying, at least one of a position where an event occurred at or around a time designated by the received playback instruction and a position of an object associated with the event, and
the virtual viewpoint image at a time designated by the received playback instruction is generated by using a plurality of images obtained based on image capturing with the selected one or more sets of image capturing apparatuses.

9. The information processing apparatus according to claim 8, wherein in the specifying, the position of the object in the image capturing region is specified in a case where there is no event occurred in a period of a predetermined length including the time designated by the received playback instruction.

10. The information processing apparatus according to claim 1, wherein at least one of the position of the object and the position where the event occurred in the image capturing region is specified based on an image captured by an image capturing apparatus included in the plurality of sets of image capturing apparatuses.

11. The information processing apparatus according to claim 1, wherein the acquired viewpoint information indicates the view direction from the virtual viewpoint and the position of the virtual viewpoint designated by user operation.

12. The information processing apparatus according to claim 1, wherein in the selecting, one set of image capturing apparatuses for generating the virtual viewpoint image is selected, based on the specified position, from a plurality of sets of image capturing apparatuses that can capture the specified position.

13. An information processing method comprising:
specifying at least one of a position of an object and a position where an event occurred in an image capturing region subject to imaging by image capturing apparatuses;
specifying a plurality of target positions in the imaging capturing region, each of which corresponds to one of a plurality of sets of image capturing apparatuses, a plurality of image capturing apparatuses included in a set of image capturing apparatuses being oriented toward one target position associated with the set of image capturing apparatuses,
selecting, based on the specified position and the specified plurality of target positions, one or more sets of image capturing apparatuses for generating a virtual viewpoint image among the plurality of sets of image capturing apparatuses;
acquiring viewpoint information indicating a view direction from a virtual viewpoint and a position of the virtual viewpoint; and
generating a virtual viewpoint image according to the acquired viewpoint information by using a plurality of images obtained based on image capturing by the selected one or more sets of image capturing apparatuses.

14. A non-transitory computer-readable storage medium storing a computer program for causing a computer to execute a method, the method comprising:
- specifying at least one of a position of an object and a position where an event occurred in an image capturing region subject to imaging by image capturing apparatuses;
- specifying a plurality of target positions in the imaging capturing region, each of which corresponds to one of a plurality of sets of image capturing apparatuses, a plurality of image capturing apparatuses included in a set of image capturing apparatuses being oriented toward one target position associated with the set of image capturing apparatuses,
- selecting, based on the specified position and the specified plurality of target positions, one or more sets of image capturing apparatuses for generating a virtual viewpoint image among the plurality of sets of image capturing apparatuses;
- acquiring viewpoint information indicating a view direction from a virtual viewpoint and a position of the virtual viewpoint; and
- generating a virtual viewpoint image according to the acquired viewpoint information by using a plurality of images obtained based on image capturing by the selected one or more sets of image capturing apparatuses.

15. The information processing apparatus according to claim 1, wherein
- the one or more sets of image capturing apparatuses for generating the virtual viewpoint image is selected further based on the acquired viewpoint information.

* * * * *